…

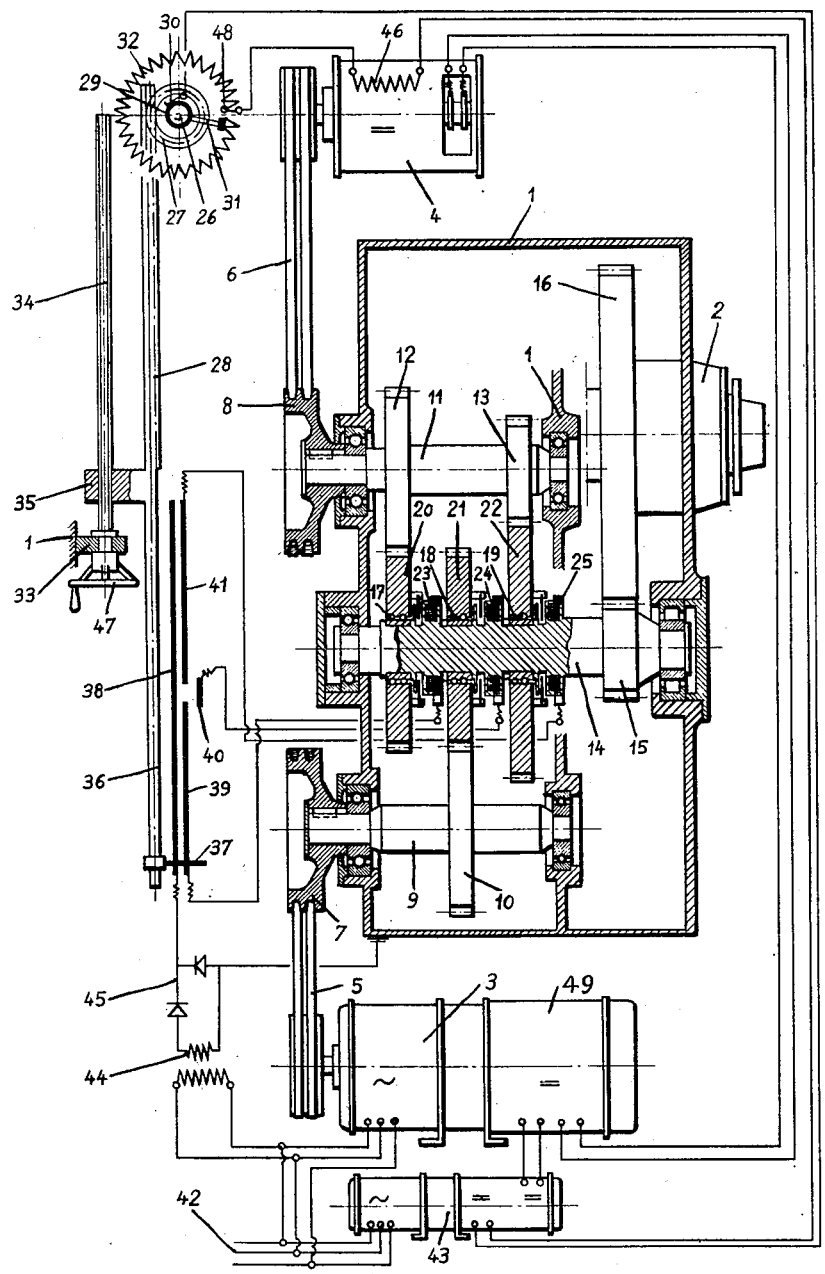

United States Patent Office

2,790,337
Patented Apr. 30, 1957

2,790,337

INFINITELY VARIABLE TWO-MOTOR DRIVE

Ottomar von Zelewsky, Neuhausen am Rheinfall, and Albert Schmid, Schaffhausen, Switzerland, assignors to Georg Fischer Aktiengesellschaft, Schaffhausen, Switzerland, a Swiss company Application July 21, 1954, Serial No. 444,854

Claims priority, application Switzerland August 29, 1953

8 Claims. (Cl. 74—665)

The present invention relates to an infinitely variable two-motor drive, preferably for machine tools. It is known to employ infinitely variable two-motor drives for machine tools with wide speed ranges. In one suggested construction both motors operating alternately are infinitely variable.

The present invention is distinguished from the known constructions by the fact that the driven machine member can alternately be coupled, by means of a change-speed gear, with a motor operating at variable speeds and, through a second gear, with a motor operating at constant speed. The change-speed gear divides the entire speed range of the driven member into at least two slightly overlapping fractional speed ranges corresponding to the adjustment range of the motor operating at variable speeds in such a manner that the constant-speed motor is coupled to the driven member in the overlapping portions of the fractional speed ranges by clutches arranged in the change-speed gear, while the variable-speed motor is disconnected from the driven member.

The drawing shows a schematic embodiment, partly in section, of the invention with a gear-box 1 in which the driven member is a lathe or working spindle 2 rotatably arranged. An asynchronous constant-speed motor 3 drives the V-belt pulley 7 via a V-belt 5, which pulley is arranged on a shaft 9 mounted in the gear-box 1 and provided with a gear wheel 10. The constant-speed motor 3 also drives the generator 49 which is the power source for the variable-speed motor 4.

The variable-speed motor 4 actuates a V-belt pulley 8 via a V-belt 6, which pulley is mounted on a shaft 11 arranged in the gear box and having two gears 12, 13. The gear-box 1 further houses a shaft 14 with a pinion 15 which engages gear wheel 16 on the working spindle 2. The shaft 14 holds the gear wheels 20, 21, and 22 on bearings 17, 18, 19, which wheels continually mesh with the gear wheels 12, 10 and 13 respectively. The wheels 20, 21, and 22 can selectively be coupled to the shaft 14 by means of electric clutches 23, 24, and 25.

The control unit for speed changing consists of the following members: On the shaft 26 with the pinion 27 engaging a rack 28 are arranged a slip ring 29 and a contact lever 31. A brush 30 glides on slip ring 29, and the contact lever 31 glides across contacts of a resistance or potentiometer 32 connected in the circuit of the exciting winding 46 of the variable-speed motor 4.

A tongue 33 on a stationary machine member, such as the gear-box 1, axially holds a threaded spindle 34. On the said threaded spindle 34 carrying a hand wheel 47 is a nut 35 which may be axially displaced. This nut 35 is connected with the rack 28 on which is mounted a rod 36 with a sliding contact 37. The latter slides continuously on a contact rail 38 on the one hand, or alternately on contact rails 39, 40, and 41 on the other, thus positively energizing one of the clutches 23, 24, and 25 according to the desired speed of the driven member 2.

The two-motor drive according to the present invention operates as follows:

The entire speed range of the driven member, which is a working spindle 2 of a machine tool in the embodiment illustrated, is divided into two identical, slightly overlapping fractional speed ranges by the ratios of the gear wheels 12, 20, and 13, 22 of the change-speed gear.

The constant-speed motor 3 driving the power source of the variable-speed motor 4 in the embodiment shown, drives the gear wheel 21 on shaft 14 at a constant speed within the overlap of the two fractional speed ranges by virtue of the ratio of gear 10 to gear 21, i. e. at the overlap point where the shaft 14 rotates at approximately the same speed if the motor 4 operates at its minimum speed through gear wheels 12, 20 and the coupling or clutch 23, or if the same motor 4 operates at its maximum speed through the gear wheels 13, 22 and the clutch 25.

From the mains 42 to which additional switch members (not shown) may be connected, current reaches the constant-speed motor 3 and an exciter motor 43 and transformer 44.

One terminal of a rectifier 45 is grounded at the gearbox 1 while the other terminal leads to the contact rail 38.

In the position shown in the drawing, the sliding contact 37 engages the contact rails 38, 39, thus energizing the clutch 23 so that the gear wheel 20 is coupled to the shaft 14. The motor 4 drives the pinion 15 through the gear wheels 12, 20 and the shaft 14, and the working spindle 2 through the gear wheel 16. Since the full resistance is operative according to the position of the nut 35 on the threaded spindle 34 and the corresponding position of the contact lever 31 and the contacts of the resistance or potentiometer 32, the motor 4 operates at top speed.

Rotation of the hand wheel 47 displaces the sliding contact 37 upward so that the contact lever 31 on the contacts of the potentiometer 32 is displaced in clockwise direction. By changing the exciting field 46 the speed of the motor 4 and that of the working spindle 2 is reduced until the contact lever 31 reaches the contact 48, at which time the motor 4 operates at minimum speed. At the same time the sliding contact 37 has reached the point where the contact rail 39 ends and the rail 40 begins, so that the clutch 24 becomes energized and the clutch 23 de-energized. The constant-speed motor 3 now takes over the drive of the working spindle 2 under load through the members 9, 10, 21, 14, 15 and 16.

Continued rotation of the hand wheel 47 further displaces the sliding contact 37 upward so that, on the one hand, the contact lever 31 is again moved into the position shown in the drawing, where the motor 4 operates at top speed; and, on the other, the sliding contact 37 leaves contact rail 40 to engage rail 41 so that the clutch 25 becomes energized and the clutch 24 de-energized. At this moment the motor 4 takes over the drive of the working spindle 2 under load through the members 6, 8, 11, 13, 22, 14, 15, and 16. Further rotation of the hand wheel 47 again shifts the contact lever 31 on the potentiometer 32 in a clockwise direction until the motor 4 operates at minimum speed.

Rotation of the hand wheel in the opposite direction repeats the same process in inverse order, the constant-speed motor 3 again taking over the drive under load in the overlap point of the two speed ranges.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a system for driving a driven member at an infinitely variable speed, and having a constant-speed motor and a variable-speed motor; rotatably supported shaft means operatively connected with said driven member, first, second and third gear means on said shaft means, means for selectively engaging one of said first, second and third gear means with said shaft means, fourth and fifth gear means driven by said variable-speed motor and operatively connected with said first and second gear means, respectively, sixth gear means driven by said constant-speed motor and operatively connected with said third gear means, whereby said driven member may be driven at a first range of variable speeds by said variable-speed motor through said fourth and first gear means upon selective engagement of said first gear means with said shaft means, said driven member being driven at a second range of variable speeds through said fifth and second gear means upon selective engagement of said second gear means with said shaft means, said driven member being driven at a constant speed by said constant-speed motor through said sixth and third gear means upon selective engagement of said third gear means with said shaft means.

2. In a system according to claim 1, the ratios of said first to said fourth gear means and said second to said fifth gear means being such that the maximum speed of said shaft means in said first speed range is slightly greater than the minimum speed in said second speed range, said first and second speed ranges thereby overlapping slightly.

3. In a system according to claim 2, the ratio of said third to said sixth gear means being such that when said third gear means engages said shaft means said drive member is driven at a constant speed lying in the overlapping portion of said first and second speed ranges.

4. In a system according to claim 3, said means for selectively engaging one of said first, second and third gear means with said shaft means including first, second and third electric clutch means, respectively, and further including change speed means selectively and sequentially operatively connected with said first, third and second clutch means, whereby upon operating said change speed means said shaft means is driven in sequence in said first speed range, at said constant speed and then in said second speed range.

5. In a system according to claim 4, said change speed means including common resistor means controlling the variable speed of said variable-speed motor in both of said speed ranges, and displaceable means to vary the effective portion of said resistor means to thereby vary the speed of said variable-speed motor, movement of said displaceable means in one direction serving to vary the effective portion of said resistor means beyond a predetermined extent corresponding to the maximum speed in said first speed range and causing said third clutch means to become actuated for driving of said shaft means at constant speed by said third gear means, further movement of said displaceable means in said one direction causing said second clutch means to become actuated for driving said shaft means in said second speed range.

6. In a system according to claim 1, including generator means for said variable-speed motor, said constant-speed motor driving said generator means.

7. In a system according to claim 1, said constant-speed motor being an asynchronous motor.

8. A system for driving a shaft at an infinitely variable speed, comprising a constant-speed motor, a variable-speed motor, a plurality of gear means selectively driven by said variable-speed motor for driving said shaft at a plurality of respectively corresponding and overlapping speed ranges, further gear means driven by said constant-speed motor for driving said shaft at a constant speed in the overlapping portion of said speed ranges, and means for selectively and sequentially operatively connecting said shaft with one of said plurality of gear means, then with said further gear means and subsequently with another of said plurality of gear means.

References Cited in the file of this patent
UNITED STATES PATENTS

| | | |
|---|---|---|
| 1,593,259 | Hinnekens | July 20, 1926 |
| 1,951,875 | Laabs | Mar. 20, 1934 |
| 2,281,569 | Fritsche | May 5, 1942 |
| 2,483,017 | McFeaters | Sept. 27, 1949 |
| 2,578,015 | Reinhard | Dec. 11, 1951 |